United States Patent [19]
Azure, Jr.

[11] 3,737,628
[45] June 5, 1973

[54] AUTOMATICALLY PROGRAMMED TEST GRADING AND SCORING METHOD AND SYSTEM

[75] Inventor: Leo L. Azure, Jr., Richland, Wash.

[73] Assignee: Automatic Corporation, Richland, Mich.

[22] Filed: June 11, 1971

[21] Appl. No.: 152,211

[52] U.S. Cl.........235/61.6 E, 35/48 B, 235/61.11 R, 235/61.12 N
[51] Int. Cl.......G09b 7/02, G06k 7/14, G06k 15/18, G06k 19/06
[58] Field of Search............................35/48 R, 48 B; 235/61.6 E, 61.11 E, 61.11 A, 61.11 B, 61.11 D, 61.12 R, 61.12 N, 61.7 R, 61.7 B, 61.6 E, 61.9 R; 340/146.3 H

[56] References Cited

UNITED STATES PATENTS

| | | | |
|---|---|---|---|
| 3,487,560 | 1/1970 | Hassfurther et al. | 35/48 B |
| 3,487,561 | 1/1970 | Azure | 35/48 B |
| 3,445,942 | 5/1969 | Azure | 35/48 B |
| 3,299,254 | 1/1967 | Dobbins | 35/48 B |
| 3,273,120 | 9/1966 | Dustin | 340/146.3 H |
| 3,201,569 | 8/1965 | Conron | 235/61.7 R |
| 3,408,482 | 10/1968 | Busby | 35/48 B |
| 3,212,203 | 10/1965 | Atkinson | 35/48 B |
| 3,539,778 | 11/1970 | Glorioso | 235/61.11 E |

OTHER PUBLICATIONS

Hoernes, G. E. & Maley, G. A., "Self-Teaching Machine", IBM Tech Disclosure Bull. Vol. 4, No. 12, May 1962, pp. 27-28.
Allen, Lowell G., "Data Comparison Device", IBM Tech. Disclosure Bull., Vol. 2, No. 4, December 1959, pp. 123-124.

Primary Examiner—Maynard R. Wilbur
Assistant Examiner—Robert M. Kilgore
Attorney—Edward S. Irons, Mary Helen Sears, Harry John Staas

[57] ABSTRACT

A test grading and marking method and system is automatically programmed by correct answer information presented on a program card, student answer selections for the corresponding problems as presented by successive student cards being compared with the stored correct answer information from the program card for grading and marking of the student card. Each set of related student cards is arranged in a stack preceded by a corresponding program card and a plurality of such sets of related student and program cards may be arranged in a stack and automatically fed through the apparatus, each new program card automatically reprogramming the memory with the correct answer information for the succeeding student cards of the associated set. The correct answer memory comprises a plurality of synchronized recirculating shift registers corresponding in number to the number of answer selections for each item of the program and student cards and each having a number of storage positions corresponding to the number of items on each such card. Gating circuitry assures accurate input and readout of data from the shift registers, synchronized with presentation of successive items from the program and student cards, respectively. Mark discrimination for selecting the darkest mark as the answer selection for each item is provided, or multiple answer selections may be accommodated. Marking of the student card includes edge marking to identify incorrectly answered problems for qualitative item analysis and marking of the correct answer selections for each incorrectly answered problem. Total score marking is effected in a preprinted scoring column as an edge mark further affording a scoring profile for an associated set of student cards. Error detection circuits assure proper sequencing of program and associated student cards and of correct card placement for feeding as well as altered student cards.

17 Claims, 12 Drawing Figures

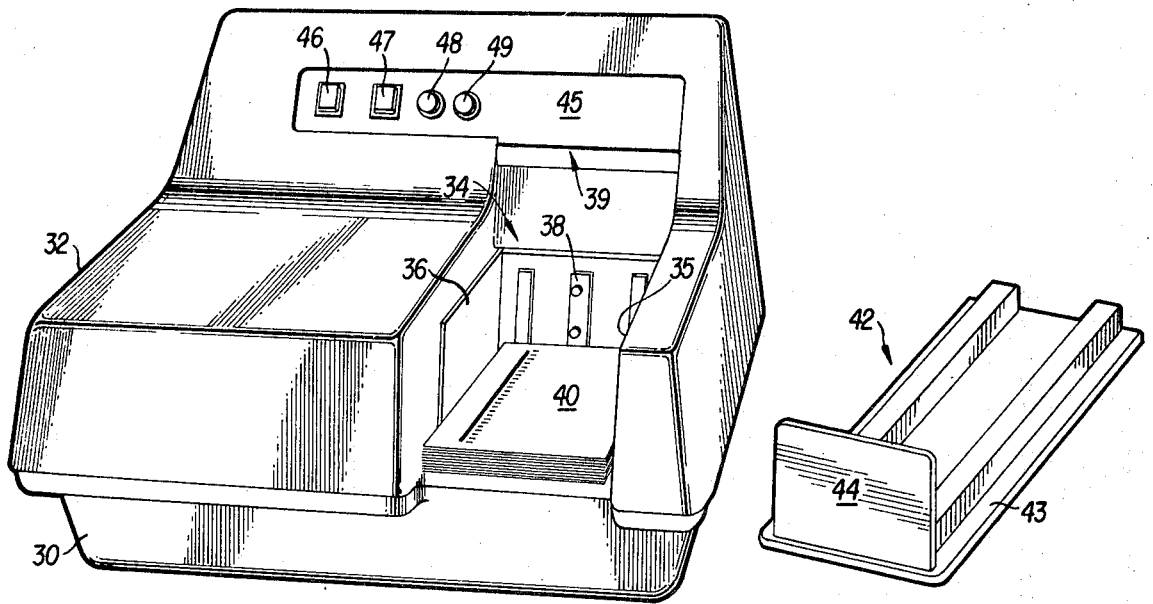
FIG. 1
FIG. 2
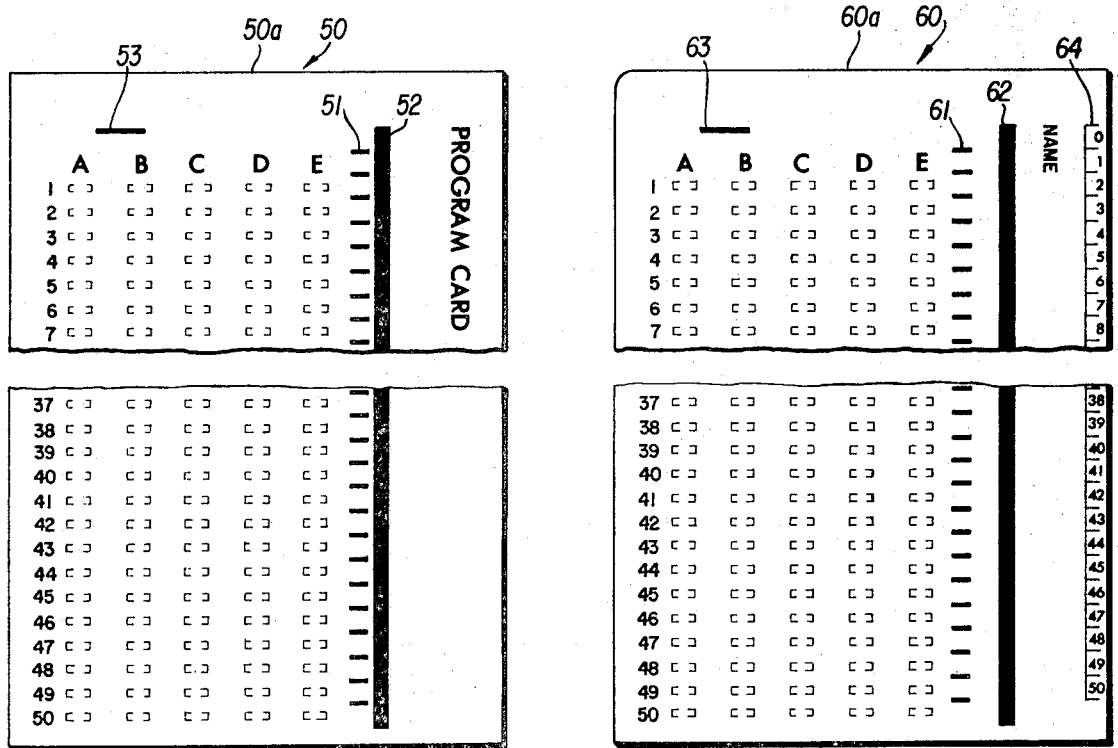
FIG. 3
FIG. 4
INVENTOR
LEO L. AZURE, JR.
BY Irons, Sears, Staas, Halsey & Santorelli
ATTORNEYS

MARK SENSING
100

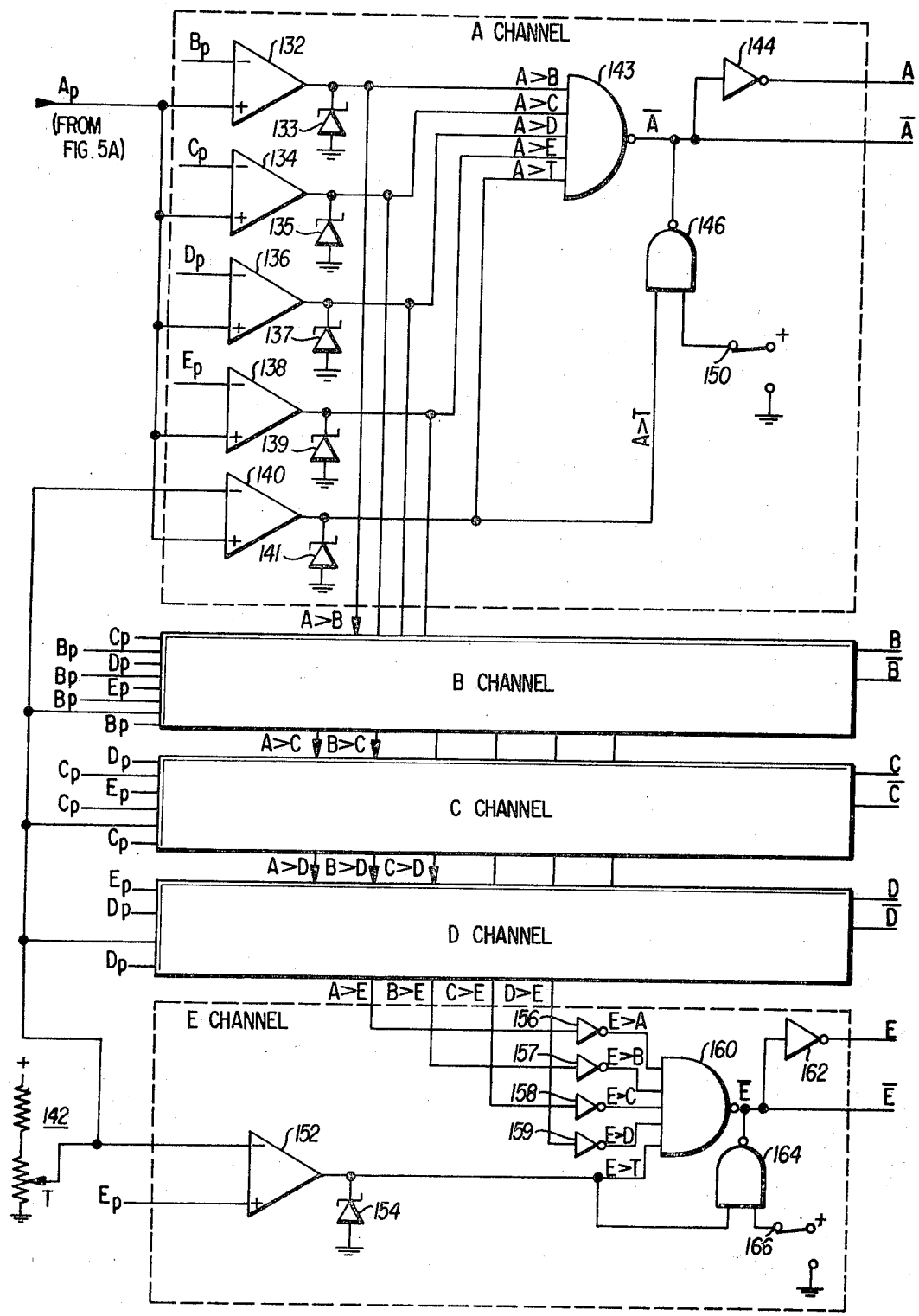
FIG. 5B SELECTIVE MARK DISCRIMINATION 130

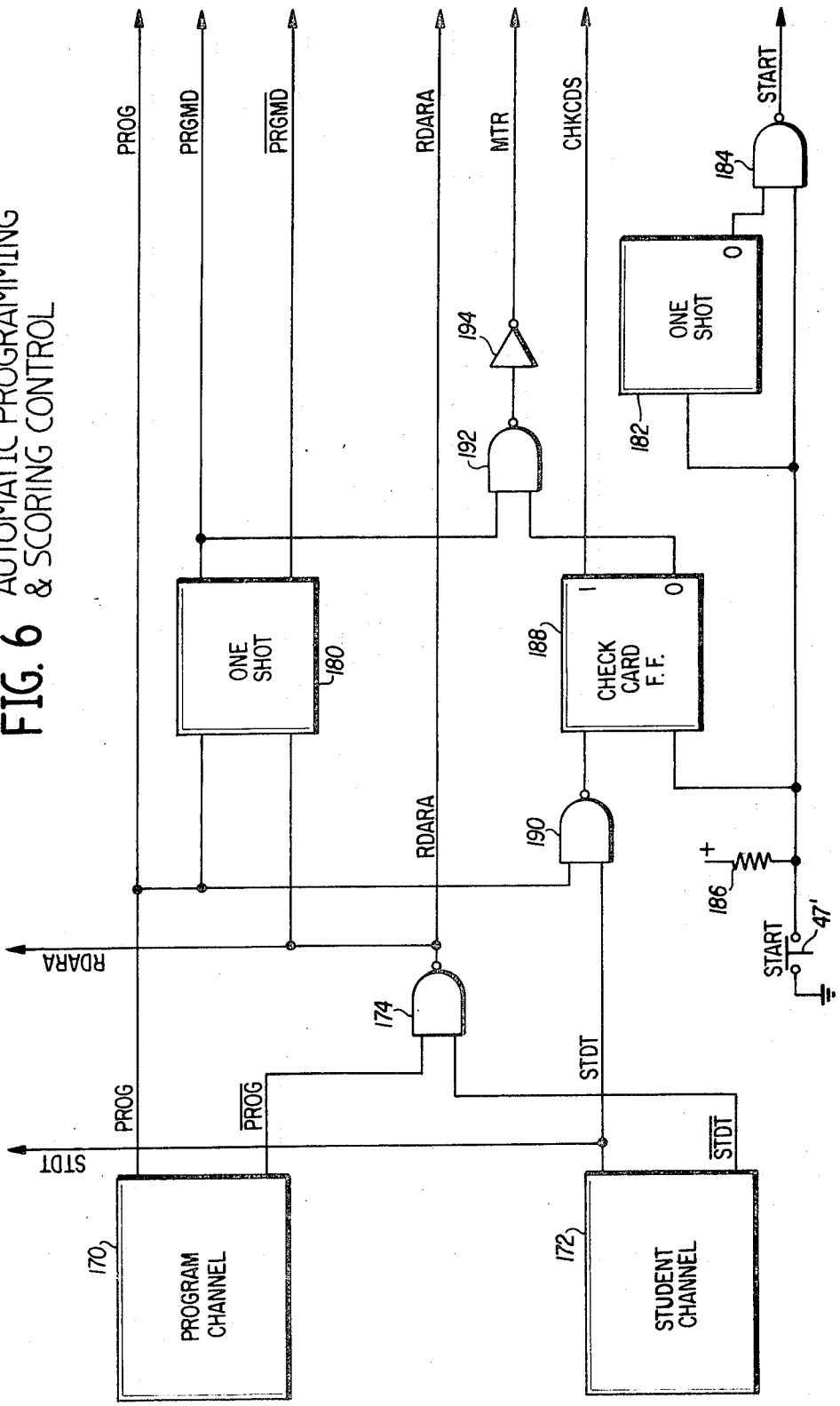
FIG. 6 AUTOMATIC PROGRAMMING & SCORING CONTROL

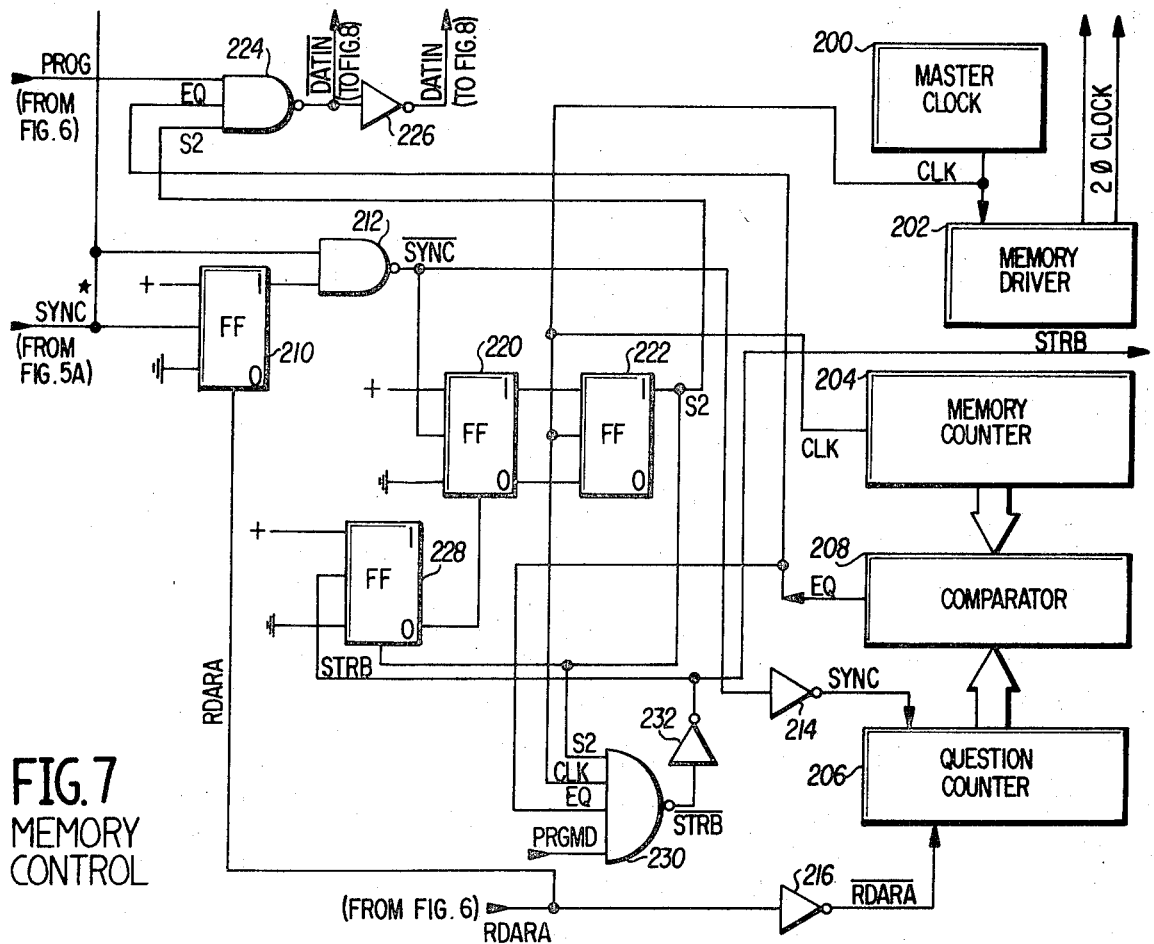
FIG. 7 MEMORY CONTROL
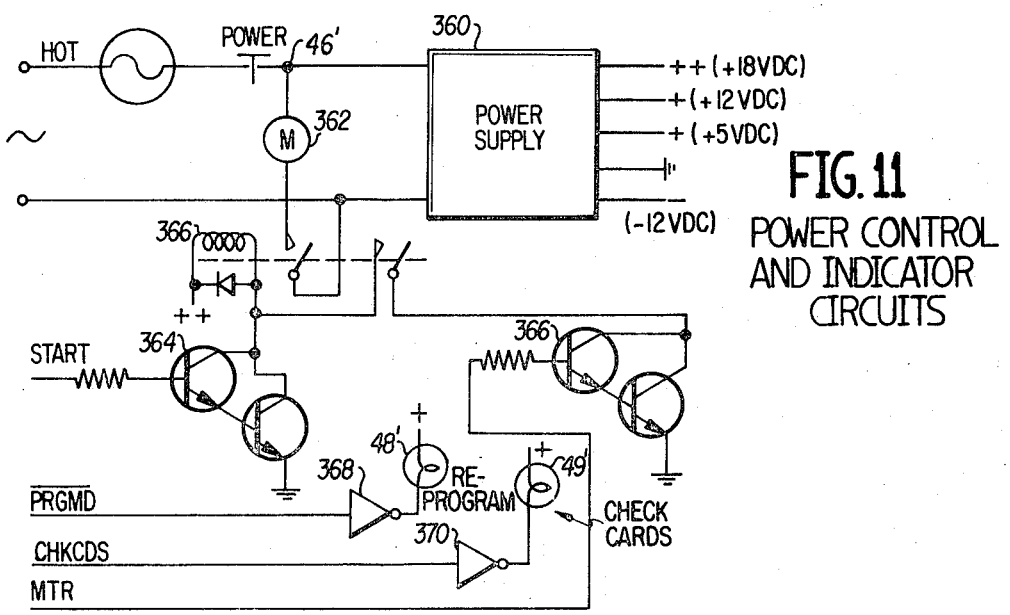
FIG. 11 POWER CONTROL AND INDICATOR CIRCUITS

DYNAMIC MEMORY

FIG. 9 ANSWER COMPARISON — MARKING AND SCORING

TOTAL SCORE MARKING

AUTOMATICALLY PROGRAMMED TEST GRADING AND SCORING METHOD AND SYSTEM

BACKGROUND OF THE INVENTION

1. Field of the Invention

This invention relates to a method and system for scoring and marking cards bearing answer choice indicia and particularly to such a method and system wherein the correct answer information is automatically programmed and answer selection information is compared thereto for scoring and grading purposes.

2. State of the Prior Art

Methods and systems for scoring and marking test cards to which are applied indicia representing answers to problems of the multiple choice answer type are well known in the prior art. Examples of such prior art methods and systems are set forth in U.S. Pats. Nos. 3,284,929 of Leo L. Azure, Jr., entitled "Test Grading Machine"; 3,487,561 of Azure and Hassfurther, entitled "Test Grading and Marking Method and Apparatus", and 3,487,560 of Hassfurther and Gates, entitled "Test Grading and Marking Method and Apparatus", all assigned to the assignee of the present invention.

The methods and systems disclosed in these prior patents provide a number of unique functions in correcting test cards bearing answer selection indicia in an automatic manner and without the necessity of skilled operating personnel. The test cards typically include a group of answer indication areas equal in number to the number of answer choices for each problem of a test. Answer selection indicia are applied to the areas corresponding to the answer choices believed to be correct for the related problems. Correct answer information for the problems of the test to which the test cards relate is registered in a master storage. A group of test cards are successively transported through a read system and logic circuits compare the answer indicia in succession for the plurality of problems of each card and in sequence for the plural cards, with the stored correct answer information, thereby to effect grading and scoring of the answer selections for each test card.

A read area or sensing station as disclosed in these prior patents typically employs photosensing means for sensing pencil mark indicia from the cards thereby to produce electrical signals representative of that information suitable for processing by logic circuits. The foregoing patents also teach various special features such as the marking of correct answer positions in the event that incorrect answers have been selected or as to problems for which answers are omitted. As well, there is taught the provision of edge marking of a card along a longitudinal edge for incorrectly answered problems on each card, thereby to afford a qualitative item analysis of the testing results.

SUMMARY OF THE INVENTION

The test scoring and marking method and system of the invention affords numerous advantages and improvements over the methods and systems of the prior art. Sophisticated solid state memory and logic processing circuits contribute to higher speeds of operation and greater reliability, so affording reduced cost and complexity of the system. Greatly simplified programming of correct answer information is afforded enabling, in fact, automatic programming of correct answer information for a plurality of different tests each having an associated set of test or student cards, permitting continuous scoring of a number of successive such sets of student cards without the necessity of interrupting the grading and scoring operation. More versatile and efficient scoring is thus afforded which is advantageous to the user and, as well, whereby greater reliability and avoidance of operator error is likewise realized.

Whereas the aforenoted cards bearing answer selection indicia may be of any of various types, as may be the indicia, typically the cards are adapted for receiving pencil mark indicia indicating answer selections. Also typically, the answer indication areas are arranged in a plurality of aligned columns representing, for example, multiple choice answer selections to a problem, the corresponding areas of the columns being aligned in corresponding rows which typically are numbered to relate each such row to a correspondingly numbered problem.

In accordance with the present invention, there are utilized both a program card and a student card, or cards, having corresponding configurations of the answer indication areas thereon and which generally are identical as to the number of columns and the number of items or problems as to each such card. Each card furthermore includes preprinted timing marks positioned in relation to the rows of answer indication areas and affording automatic recognition of successive rows of such areas and thus problems. Preprinted longitudinal marks or bars on each card afford automatic recognition by the apparatus of the presence of a program or student card currently being processed. Error detection circuitry furthermore recognizes alteration of a student card in an effort to present it as a program card wherein the sensors for the program and student card bars simultaneously detect the presence of bars in the corresponding areas of a given student card. The same detectors furthermore detect each card which is erroneously positioned for processing by being reversed in its position.

The correct answer data read from the thus automatically identified program card is stored in an operating memory preferably comprising a number of recirculating shift registers equal in number to the number of indicia columns and having a number of bit positions corresponding to the number of problems. Counting and comparison means and associated gating circuitry assure entry of the programmed correct answer data into the correct bit positions of the recirculating memory registers and, as well, enable the comparison of answer indicia from the student cards, for each problem in succession, with the respectively corresponding correct answer information derived at the proper time interval from the recirculating memory thereby to effect the grading and scoring of the student test cards, for each test card in succession.

A further feature of the invention is the technique of marking the total score on each student card wherein each such card carries a preprinted column of a succession of numbers corresponding to the number of problems on the test. Counting means are successively enabled for each correct answer provided on the card during the scoring operation. Following scoring and during exhaust of each such card, the timing marks on the cards are detected and generate a train of countdown pulses synchronized therefor with the speed of transport of the card as it is exhausted. The train of countdown pulses, processed in accordance with the total number of correct answers provided on a given card, serves to generate a score mark output signal which in turn actuates a marking solenoid. Appropriate positioning of the marking solenoid then effects the marking of the score mark column of a student card in the vicinity of the preprinted score number thereon corresponding to the score determined by the grading operation.

The described score marking technique is much less complex and less expensive, yet more reliable than score printing techniques of the prior art. Furthermore, the score marking may be made as an edge mark to provide a scoring profile for an associated set of student cards in accordance with the teachings of such qualitative analysis as provided by the aforenoted U.S. Pat. No. 3,487,560. The present system also incorporates edge marking as to incorrectly answered problems affording qualitative item analysis as likewise taught in that referenced patent and, as well, the marking of incorrect answer positions for incorrectly answered problems as above noted.

BRIEF DESCRIPTION OF THE DRAWINGS

FIG. 1 is a perspective view of the test scoring and marking system and apparatus of the invention, as enclosed in a housing;

FIG. 2 is a perspective view of a weight and card holder mechanism to be positioned in the card hopper of the apparatus of FIG. 1;

FIG. 3 shows a program card for use in the system of the invention;

FIG. 4 is a test card for use in the system of the invention;

FIGS. 5A and 5B show a schematic, partly in block diagram form, of mark sensing and selective mark discrimination circuits utilized in the system of the invention;

FIG. 6 is a schematic, partly in block diagram form, of automatic programming and scoring control circuits utilized in the system of the invention;

FIG. 7 is a schematic, partly in block diagram form, of memory control circuits utilized in the system of the invention;

FIG. 11 is a schematic, partly in block diagram form, of power control and indicator circuits utilized in the system of the invention.

DETAILED DESCRIPTION OF THE INVENTION

Figure 5A:
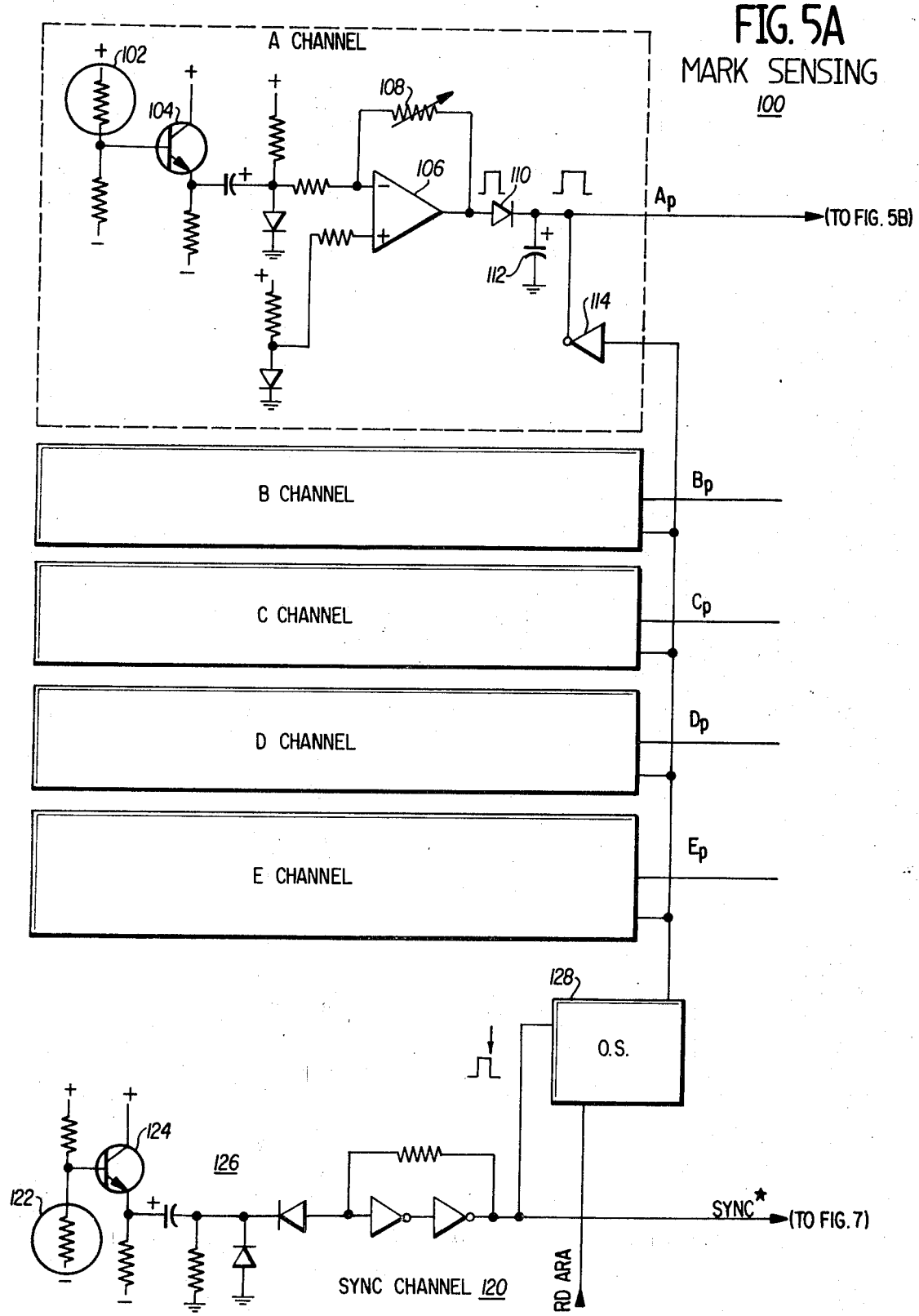

FIG. 1 is a perspective view of a housing incorporating the system of the invention and particularly including a base 30 and cover 32. The cover defines an open hopper 34 including side walls 35 and 36 and a rear wall 37. An adjustable bar 38 defines a throat at the lower edge thereof with respect to the base plate (not shown) of the hopper which lies in a generally horizontal plane and on which a stack of test cards 40 is received. In a conventional manner, the throat permits a bottom feed mechanism (not shown) to feed a single card at a time from the stack 40 through the throat to be processed internally of the apparatus and, following processing, to be exhausted through the open slot 39.

In FIG. 2 is shown a weight 42 having a bottom plate 43 generally conforming to the dimensions of the cards and adapted to be received thereon within the hopper 34. The weight 42 includes an upright element 44 which serves as a handle to facilitate insertion and removal thereof from the hopper 34 and as well to define a stop against which cards exhausted through the slot 39 abut, thereby stacking the exhausted cards on the upper surface of the weight 42.

Control panel 45 includes a basic on/off power switch 46, a start switch 47, and indicator lights 48 and 49 labeled Reprogram and Check Card, respectively, the functions of which will be described hereafter.

Depending upon the particular configuration of the hopper, any of various commercially available types of card feed mechanism may be employed and examples of suitable card mechanisms are afforded in U.S. Pats. Nos. 3,487,560 and 3,487,561 and pending application Ser. No. 121,411, filed Mar. 5, 1971, all being assigned to the assignee of the present invention. As disclosed in the first two aforesaid patents, and as incorporated herein, the cards are fed individually and in succession from the stack, through a sensing station at which the mark data is sensed from each card for progressing by logic circuits, and then through a marking station and finally through an exhaust system. As later discussed, the cards are processed with the lower edges leading.

In FIG. 3 is shown a program card, and, in FIG. 4, a student card, or test card, for use in the system of the invention. The cards are received in stacked relationship in the hopper of the apparatus of FIG. 1, as shown therein at 40, for processing. As noted previously, a feature of the system of the invention is that of automatically programming the correct answer information into an operating memory thereof by the simple expedient of feeding a program card through the apparatus. By this technique, correct answer information read from the program card is stored in the memory and is thus available for comparison with each subsequent and associated test card. Each new program card automatically reprograms the memory. Thus, any number of different sets of test cards, wherein the cards of each such set relate to the same test, for example, may be automatically processed and scored by the simple expedient of preceding the stacked cards of each such set with an associated program card bearing the correct answer information thereon for that test. Several such associated sets of program and test cards may thus be presented in the hopper 34 and automatically and rapidly fed through the apparatus in succession, each new program card automatically programming the memory to afford the correct answer information for scoring the associated and subsequently fed cards of the associated set.

Referring more specifically to FIGS. 3 and 4, the program card 50 and the test card 60 include corresponding arrays of answer indication areas, each defined by a pair of brackets and aligned in vertical columns A B C D and E for each of 50 rows thereof, numbered 1 through 50, and corresponding to similarly identified items. For example, the areas A through E may represent multiple choice answers to test problems bearing corresponding numbers. On each of the cards 50 and 60 there is provided a corresponding column of timing marks 51 and 61. Each column includes 51 such marks, the first thereof in each instance establishing initial synchronization, as later described, and the remaining 50 affording timing and synchronization for response to answer marks in the preceding row of areas A through E for each item.

The cards 50 and 60 furthermore include longitudinal bars 52 and 62, respectively, which are separately recognized by photosensing and associated logic circuits to identify each card being processed as either a program card or a test card. Close examination reveals that the bars 52 and 62 are relatively displaced from corresponding lateral edges of the cards, and the associated sensors are correspondingly positioned thereby to detect which type of card is present.

The cards 50 and 60 also include lateral bars 53 and 63, printed thereon and which afford an error detection function. Particularly, the bar 53 is located so as to span a lateral dimension of the card corresponding to that occupied by the bars 52 and 62 of the individual cards 50 and 60 with respect to a given longitudinal edge of the cards, such as when superposed on one another. If a card is inserted in the hopper in a reverse orientation, such that instead of the bottom edges 50a and 60a being presented first, the top edges 50b and 60b are first presented, the two sensors for the individual longitudinal bars 52 and 62 simultaneously sense the single, lateral bar 53, or the lateral bar 63, in each instance. The simultaneous outputs then indicate the erroneous positioning of a card and produce energization of a lamp for the check card indicator 49 in FIG. 1. Simultaneously, the motor drive is terminated and the operator thus is enabled to remove the erroneously positioned card.

The circuitry which affords this error detecting function also affords detection of altered cards such as where a student might attempt to make his student card 60 appear as a program card by drawing in a longitudinal bar corresponding to the bar 52 of the program card 50. Again, the detector for the bars 52 and 62 would simultaneously recognize the bars and produce the check card indication as above with the simultaneous termination of the motor drive.

The test or student card 60 further includes a score mark column 64 including numbers from 0 to 50. In a manner to be described, the apparatus, following the scoring of each answer selection on a given card, automatically imprints a mark adjacent the number in the column 64 corresponding to the total number of correct answers, thereby providing a score indication on each card. This technique is far simpler and less expensive than the conventional practice of using totalizing counter/printers to imprint a total score on each card. This technique also affords a qualitative analysis, or indication, of the score distribution or profile for a group of students taking the same or similar tests, or for a number of tests of a given student, or any similar collection of scored cards 60. Particularly, the cards are stacked with the columns 64 similarly positioned and the longitudinal edge of the score cards viewed. By printing the score mark immediately on that longitudinal edge, it is rendered viewable from the edge of each such card and thus for the stack of cards, particularly where the cards of the stack are slightly displaced. A similar profile technique for identifying incorrectly answered questions by printing an edge mark on the edge of a card is disclosed and claimed in the above noted U.S. Pat. No. 3,487,560. The apparatus of the present invention also incorporates that capability, as later described. The error marks in that instance, however, are disposed along the left longitudinal edge of the cards as viewed in FIG. 4 and thus the error mark profile is obtained by viewing the opposite longitudinal edges of the stacked cards.

A detailed schematic of the system of the invention is shown, partially in block diagram form, in the following series of FIGS. 5 through 11. Considering first FIG. 5, there is shown mark sensing circuits 100 for each of channels A through E corresponding to the mark indication areas A through E of the program and student cards, all of which may be identical and thus only the channel A is shown in detail. Particularly, channel A includes a photosensing device 102 connected in a conventional circuit to provide a negative going pulse output to transistor amplifier 104 in response to sensing of each mark in the A column. The output of amplifier 104 is supplied through a conventional differentiating and bias circuit to a first input of operational amplifier 106. The other input of amplifier 106 is connected to a conventional biasing circuit. An adjustable feedback resistor 108 affords a gain adjustment for the photosensor. A peak holding circuit is afforded by diode 110 and capacitor 112, the discharge of the latter being time controlled by an output from inverter 114, to be described. There is thus derived as the output $A_p$ a square wave pulse of controlled amplitude and duration suitable for subsequent processing. As noted, similar circuits for channels B through E produce $B_p$ through $E_p$, respectively, when the corresponding photosensors detect a mark in the respectively associated answer indication areas.

Associated with the mark sensing channels A through E is a sync channel 120 for sensing the columns of timing marks 51 and 61 of the cards 50 and 60, respectively. Sync channel 120 similarly includes a photosensor 122 connected in a conventional biasing circuit to provide an input to transistor amplifier 124, the output of which is supplied through conventional differentiator, biasing and level setting circuits 126 to produce a square wave output identified as SYNC*.

SYNC* is applied to one shot 128, the trailing edge thereof, as indicated, setting the one shot and the latter producing a very short duration output pulse, as indicated. The reset time of the one shot 128 is very short compared with the duration of a sync pulse. The input RDARA, derived from the circuit of FIG. 6, when false, clears the one shot 128 and, when true, enables the latter to be set by the SYNC* pulse.

The short duration pulse, or spike, output of one shot 128, is applied to each of the mark sensing channels A through E. As shown for channel A, the pulse is applied to inverter 114 to discharge the storage capacitor 112. Thus, the signal produced upon sensing a mark and which precedes sensing of the associated timing mark, is stored by the peak holding circuit until the spike pulse output of one shot 128 is produced in response to the trailing edge of the SYNC* pulse, and thus upon detection of the trailing edge of the associated timing mark.

The selective mark discrimination circuit 130 for channels A through E is shown in FIG. 5 in detailed logic circuits for channels A and E and in block diagrams for channels B through D. Each channel produces an output, representing the sensing of a mark in the corresponding column, only when the mark sense output corresponding thereto exceeds the output from each of the other channels for a given row of mark indication areas, and thus for a given item or problem, and, as well, exceeds a predetermined threshold level. As will be described, the mark discrimination function may be disabled in the event that it is desired to program two or more correct answers to a given problem, the single answer selection function of the mark discrimination circuit being inconsistent therewith.

Considering first the circuit for the A channel, there are provided differential amplifiers 132, 134, 136 and 138 receiving in common the mark sensing signal A$p$ at the positive inputs thereto, and respectively receiving the mark sensing signals B$p$ through E$p$ at the negative inputs thereto. Differential amplifier 140 likewise receives at the positive input and a steady state adjustable bias signal from a threshold adjust circuit 142 at the negative input. Zener diodes 133, 135, 137, 139 and 141 clamp the maximum output signal level from the associated amplifiers, such as to +5 volts as required by subsequent logic circuits, such as NAND gate 143.

The differential amplifiers 132 through 140 thus perform the comparison determinations $A>B$, $A>C$, $A>D$, $A>E$ and $A>T$, respectively, the outputs corresponding thereto being applied to the five input NAND gate 143. When each of these inputs is true, NAND gate 143 produces a false output $\overline{A}$ and, through inverter 144, the true output A, indicating sensing of a mark in the A column, the mark sense output for which is greater than the mark sense output for any other marks detected in any other column for that row and, as well, exceeds the predetermined threshold level, T.

Selection of the mark discrimination function, or conversely, disabling thereof to enable multiple mark detection, is afforded by the two input NAND gate 146 and associated switch 150. NAND gate 146 receives the $A>T$ output of amplifier 140, constituting a first enabling input whenever the mark sense signal A$p$ exceeds the threshold level, T. When switch 150 is set to the positive terminal, NAND gate 146 is enabled each time that $A>T$ is true. Conversely, when switch 150 is set to ground, NAND gate 146 is disabled regardless of $A>T$ being true, and thus the output for the A channel is determined by NAND 143 in accordance with the discrimination function.

Each of the comparison determinations afforded by the logic circuits of the A channel is useful in the corresponding other mark discrimination channels. For example, the E channel includes only a single differential amplifier 152 and associated Zener diode 154 to produce the $E>T$ determination. The $E>A$ determination is produced through inverter 156 from the $A>E$ output of amplifier 138 in the A channel. Similarly, $E>B$, $E>C$ and $E>D$ determinations are derived by inverting the converse of those determinations from the logic circuits for the B, C and D channels, respectively, as will be apparent.

Thus, the level determinations $B>E$, $C>E$ and $D>E$ from the corresponding B, C and D channels are applied through inverters 157 through 159, respectively, for producing the remaining inputs $E>B$, $E>C$ and $E>D$, to the NAND gate 160. NAND gate 160 thus produces the $\overline{E}$ output as true when the mark discrimination conditions are satisfied and, through inverter 162, the output E. A two input NAND gate 164 and associated switch 166 having the functions of NAND gate 146 and switch 150 in the A channel are similarly provided. In a practical system, the switches such as 150 and 166 for the plurality of channels are ganged for common actuation.

By thus utilizing the comparison determinations of preceding channels, fewer comparison circuits, i.e., differential amplifiers, are required in each succeeding channel, thereby contributing to reduced cost of components and assembly of the system. If preferred, of course, an entire set of comparison determination logic circuits as shown for the A channel may be employed for each channel.

In FIG. 6 are shown the circuits for affording automatic programming and scoring control of the system of the invention. Program and student mark sensing channels 170 and 172 are shown in block diagram form and may include circuits identical to the sync channel 120. The channels 170 and 172 respectively produce true outputs PROG and STDT in response in sensing of the bars 52 and 62 of the program and student cards of FIGS. 3 and 4, respectively. The complementary logic outputs $\overline{PROG}$ and $\overline{STDT}$ may be derived from the series junction of the two series connected inverters, as illustrated for the sync channel 120 in FIG. 5.

$\overline{PROG}$ and $\overline{STDT}$ are applied as inputs to NAND gate 174 which, when either or both of the inputs is false, produces the true output RDARA, the latter providing a logic indication that a card being processed through the apparatus is now in the read area, i.e., in the photo sensing station, and thus that mark sensing is to commence. Reference to the bars in the cards of FIGS. 3 and 4 indicates that the bars extend more closely to the lower edges of the cards than do the first set of answer indication areas for problem 50 and thus that RDARA is generated in advance of mark sensing.

One shot 180, which may be conventional in configuration, receives PROG as a set input and RDARA as a retrigger input. The reset time of one shot 180 is slightly in excess of the time interval in which successive cards enter the read area and, hence, of successive RDARA pulses. Thus, prior to sensing a program card, one shot 180 is reset, producing a true output $\overline{PRGMD}$ and a false output PRGMD.

When PROG becomes true upon sensing the bar of a program card, one shot 180 is set. Once set, one shot 180 may be retriggered by each successive RDARA input and thus maintained in the set state, regardless of the presence of a further PROG input.

Considering then the initiation of operation, and assuming the on/off switch 46 of FIG. 1 to have been depressed, actuation of start switch 47' in FIG. 6, corresponding to the start switch 47 in FIG. 1, resets the check card flip-flop 188 and resets one shot 182. The reset time of one shot 182 is selected in accordance with the operating time interval of a holding relay circuit for the transport drive motor and, as well, a timing sequence of the initiation of operation to be described. Normally, one shot 182 is reset, and thus NAND 184 receives a true input therefrom, and from resistor 186, and thus produces a false START output. Depressing start button 47' causes NAND 184 to produce a true START output, thereby energizing the motor drive circuit. One shot 182 is also set and, upon release of the start button 47', maintains a false input to NAND 184 for the set interval thereof, and NAND 184 thereby continues to produce a true START output. Upon reset of one shot 182, however, the START output of NAND 184 becomes false.

If a program card is properly presented as the first card of a stack to be processed, however, and prior to reset of one shot 182, in accordance with an appropriate selection of the reset time thereof, PRGMD becomes true. The reset output of check card flip-flop 188, which was reset by depression of start button 47', and PRGMD then able NAND 192 to produce, through inverter 194, a true MTR output. If the proper time sequence is achieved, therefore, MTR becomes true before START becomes false, and thus energization of the motor drive continues.

As previously noted, it is important that the cards be inserted in the hopper in the correct position with the bottom edge of each card leading and, as well, it is important to detect if a student's card has been altered to appear as a program card by marking in a further solid bar in the program bar position. These functions are accomplished as follows. NAND gate 190 receives as inputs PROG and STDT. These inputs are simultaneously true only when marks are simultaneously sensed by channels 170 and 172. This can occur if the cards are placed in reverse position such that the bar 53, be it a program bar, or the bar 63, be it a student card, is detected simultaneously by both the program and student card sensing channels 170 and 172. Alternatively, both outputs are true if a student has attempted to modify his student card to include a program bar, since two bars are then present. If both PROG and STDT are true, NAND gate 190 is enabled setting the check card flip-flop 188, the latter then producing the CHKCDS output. As later described, the output energizes the check card indicator lamp. Setting of flip-flop 188 also disables NAND 192 and MTR is then false, causing the card transport motor to stop, as later described. The error is then detected by examining the card in question and making the appropriate correction.

One shot 180 also resets since the requisite RDARA signal is not available from a subsequent card for retriggering. Re-initiation of scoring thus requires that a program card again be presented for programming the memory. This assures that the operator properly relates a group of student cards to be processed with the correct corresponding answer information in memory, thereby preventing faulty scoring of subsequent student cards where the memory was previously programmed from a non-corresponding program card. This same function obtains following completion of scoring of all cards in the hopper, even where no error condition arises.

Figure 8:
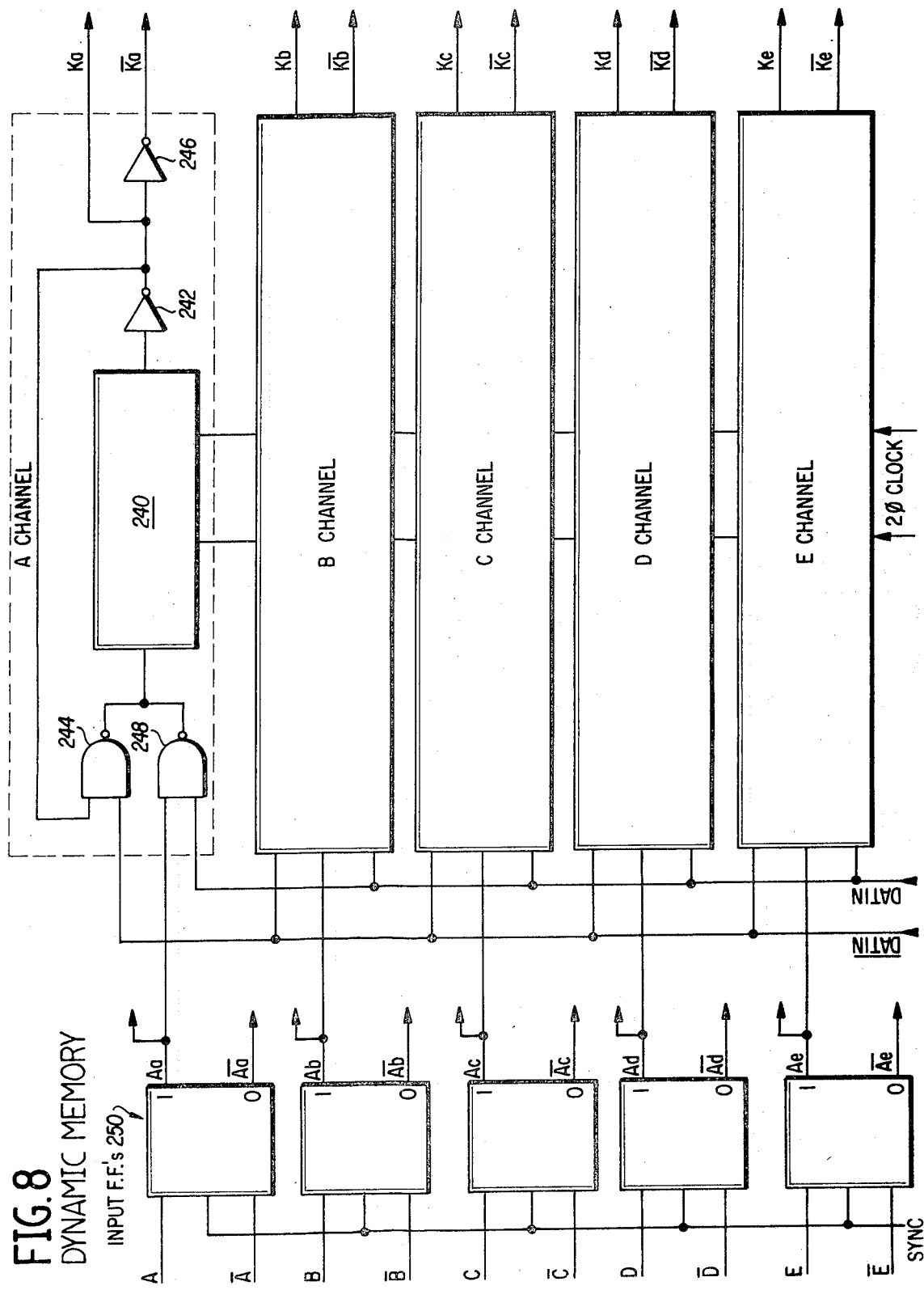
FIG. 8 is a schematic, partly in block diagram form, of a dynamic memory utilized in the system of the invention.

In FIG. 7 are shown the circuits for memory control, the memory being shown in FIG. 8. In general, the memory includes a recirculating dynamic shift register for each of the channels, each register having a bit storage capacity corresponding to the maximum number of items, or problems, on a program card. The shift register memories are of commercially available types, formed of MOS elements, and are driven in synchronism by a two-phase clock of relatively high frequency, e.g., 100 kc. The memory control of FIG. 7 provides for generation of the two-phase memory driving clock and includes counters and comparators, with appropriate logic circuits, for identifying the bit position present at the input to the shift registers in each clock pulse interval and, as well, the bit position at the output of each shift register. In addition, the memory control responds to an identification of the item or problem number during sensing of each of the successive cards, be they program or student cards, thereby to effect, respectively, input of data from the program cards into the correct bit position of the shift registers for the corresponding channels and, as well, the derivation of the programmed, or stored, bit information from the shift registers for comparison with the answer mark indicia sensed from the student cards, for each problem in succession.

Considering FIG. 7 in detail, master clock source 200, which may be conventional, generates a high frequency clock pulse train CLK of, e.g., 100 kc. CLK is supplied to a memory driver 202 which likewise may be conventional. Driver 202 produces a two-phase memory driving clock at its outputs, as indicated, and of that same frequency. CLK is also supplied to memory counter 204. The maximum count of this counter corresponds to the number of storage bit positions in each of the dynamic shift registers. Thus, memory counter 204, driven by CLK, cycles in synchronism with the plurality of parallel-connected shift register memories and its count at each clock pulse interval identifies the bit position currently presented at the inputs, as well as at the outputs, of those shift registers.

Question counter 206 likewise has a maximum count corresponding to the maximum number of problems and is advanced as each successive problem, or item, is sensed from a card being processed, in a manner to be described. Question counter 206 thus counts in synchronism with the detection of successive items from each card and recycles for each of the successively processed cards. Comparator 208 compares the count of memory counter 204 and with that of question counter 206, the latter, of course, advancing at a much slower rate. Each time that the count of memory counter 204 is identical to that of question counter 206, comparator 208 produces the output EQ. Due to the much greater speed of recirculation of the dynamic shift registers, relative to the count advance of question counter 206, e.g., 50 questions per card for 1,200 cards per hour, it will be appreciated that EQ is produced many times during the time interval of presentation of each problem, or item, for each card being processed. Thus, it is necessary to restrict the input and output of data from the shift registers to occur for but one of the plural EQ outputs as to each item from the cards. The synchronization and control circuitry for accomplishing these purposes will now be considered.

Flip-flop 210 receives the SYNC* pulses produced upon sensing of the timing marks and is switched at its output to the set state on the trailing edge of the first SYNC* pulse. Flip-flop 210 also receives RDARA which, when false, and thus prior to a card entering the read area, clears flip-flop 210. NAND gate 212 receives SYNC* and the set output of flip-flop 210. Since flip-flop 210 is not set until the leading edge of SYNC*, the first SYNC* pulse does not enable NAND 212. Flip-flop 210 thus blanks the first SYNC* pulse. The second SYNC* pulse, however, does present a second true input to NAND 212, for producing a false $\overline{\text{SYNC}}$, and, through inverter 214, the complement SYNC.

The train of SYNC pulses is supplied to question counter 206, which thus initiates counting with the second sync pulse and thus upon detection of the second timing mark. Thus, 50 SYNC pulse inputs are supplied to question counter 206, consistent with its 50 count recirculation. RDARA is supplied through inverter 216 as $\overline{\text{RDARA}}$ for clearing question counter 206, and thus in advance of the first SYNC pulse supplied thereto for each successive card.

The circuits for selecting only a single EQ interval for data input to the shift registers are now considered. Flip-flops 220, 222 and 228 are of the well known JK type, flip-flop 222 being driven as a slave from flip-flop 220. The leading edge of $\overline{\text{SYNC}}$ sets flip-flop 220 to a true state since flip-flop 228, as will be described, normally maintains a true input thereto. The trailing edge of the next clock pulse sets flip-flop 222 to a true state, producing true S2 output. Flip-flop 228 thus is enabled to be set to a false state upon receipt of STRB, a strobe pulse generated in a manner to be described, which then clears, or sets flip-flop 220 to a false state. The next clock pulse, on the trailing edge thereof, sets flip-flop 222 to the false state, producing a false S2 output and setting flip-flop 228 again to a true state, thereupon completing the cycle.

STRB is the complement of $\overline{\text{STRB}}$ received through inverter 232 from the output of NAND 230. As previously discussed, the PRGMD input to NAND 230 exists upon detecting the program bar of a program card, and so long as succeeding cards are presented in the required time sequence. Recall that EQ becomes true when the memory counter and question counter have equal counts and that S2 becomes true on the trailing edge of the first clock pulse following the leading edge of $\overline{\text{SYNC}}$ which set flip-flop 220 to a true state. Further recall that the memory counter 204 was advanced to that equal count for producing EQ on the trailing edge of a given clock pulse. It then will be appreciated that the next succeeding clock pulse CLK received by NAND gate 230 produces $\overline{\text{STRB}}$ and, through inverter 232, STRB. STRB at its trailing edge, as previously noted, sets flip-flop 228 to the false state and in turn sets flip-flop 220 to the false state. The next succeeding clock pulse CLK, at its trailing edge, then sets flip-flop 222 to a false state, in accordance with the cycle of operation as aforedescribed. Accordingly, EQ is maintained for a full clock pulse interval and STRB is produced for the latter half of that same interval. S2 furthermore becomes false a full clock pulse interval following the trailing edge of STRB and hence well in advance of memory counter 204 recycling through 50 counts at which time a further EQ would be produced.

The entry of data into the recirculating shift registers furthermore is performed during that single, thus determined, clock pulse interval EQ related to each item. This gating function is performed by NAND gate 224 which is enabled in response to the true inputs PROG, EQ and SQ to produce a false $\overline{\text{DATIN}}$ output and, through inverter 226, the complementary true DATIN output. Since EQ becomes false at the trailing edge of the clock pulse which terminates the single clock pulse interval of EQ, NAND 224 is disabled one clock pulse interval following enabling thereof and $\overline{\text{DATIN}}$ again is true and the complement, DATIN, is false. S2 then becomes false before a subsequent EQ becomes true and remains false until a subsequent SYNC* pulse is received, indicating that a successive item now is to be processed. The DATIN signal thus defines a single clock pulse interval window for inserting the bits of information for a given item from the program card into the corresponding bit positions of the plural recirculating shift register memories.

As discussed more fully hereafter, STRB also affords time control of the scoring functions, from which it follows that the timing of the scoring operation is controlled in accordance with the leading edge of the second SYNC pulse following a given item to be scored. As previously noted, furthermore, the trailing edge of that same SYNC pulse then serves to advance the question counter 206 to the next question in preparation for the comparison of scoring operations as aforedescribed for each successive item. The provision of the two timing marks extending above the first item on each of the student and program cards of FIGS. 3 and 4 also now will be clear.

In FIG. 8 is shown the dynamic memory and associated gating, each of the memory channels A through E being identical in configuration and thus only the schematic for channel A is shown in detail. The basic storage element comprises a dynamic recirculating shift register 240 driven by the two-phase clock produced by the memory driver 202 in FIG. 7. The recirculating output of shift register 240 is supplied through inverter 242 to a first input of NAND gate 244, the second input of which receives the $\overline{\text{DATIN}}$ output of NAND gate 224 in FIG. 7. $\overline{\text{DATIN}}$ is normally true and thus NAND 244 is normally enabled to continue recirculation of the contents of the memory. The memory output KA and, through inverter 246, its complement $\overline{\text{KA}}$, are thus successively produced for each bit storage position in the recirculation of the memory. Input NAND gate 248 receives DATIN which is normally false and, when true, permits the entry of data into the bit position presented at the input of the shift register during a single clock pulse interval, as aforedescribed.

The input information bits supplied to the second input of NAND 248 are presented by the corresponding one of the input flip-flops 250, the plurality thereof functioning as buffer storage elements for the associated memories. The flip-flops 250 receive the corresponding outputs A, $\overline{\text{A}}$, B, $\overline{\text{B}}$, etc., from the selective mark discrimination circuits 130 of FIG. 5 and are set to the corresponding states upon the trailing edge of the SYNC* pulse produced by sensing of the timing mark immediately following sensing of a given item on a card. As previously discussed, DATIN is produced in response to the next successive SYNC* pulse, and, particularly, on the leading edge of $\overline{\text{SYNC}}$ which is time coincident therefore with the leading edge of its complement SYNC and, as well, SYNC*. Thus, the leading edge of the second SYNC pulse also defines the timing for inserting data into the memories for the true PROG condition. During scoring of a student card and thus when PROG is false, those data input gates are disabled and the recirculation gates 244 are enabled and provide recirculation of the theretofore stored data.

Figure 9:
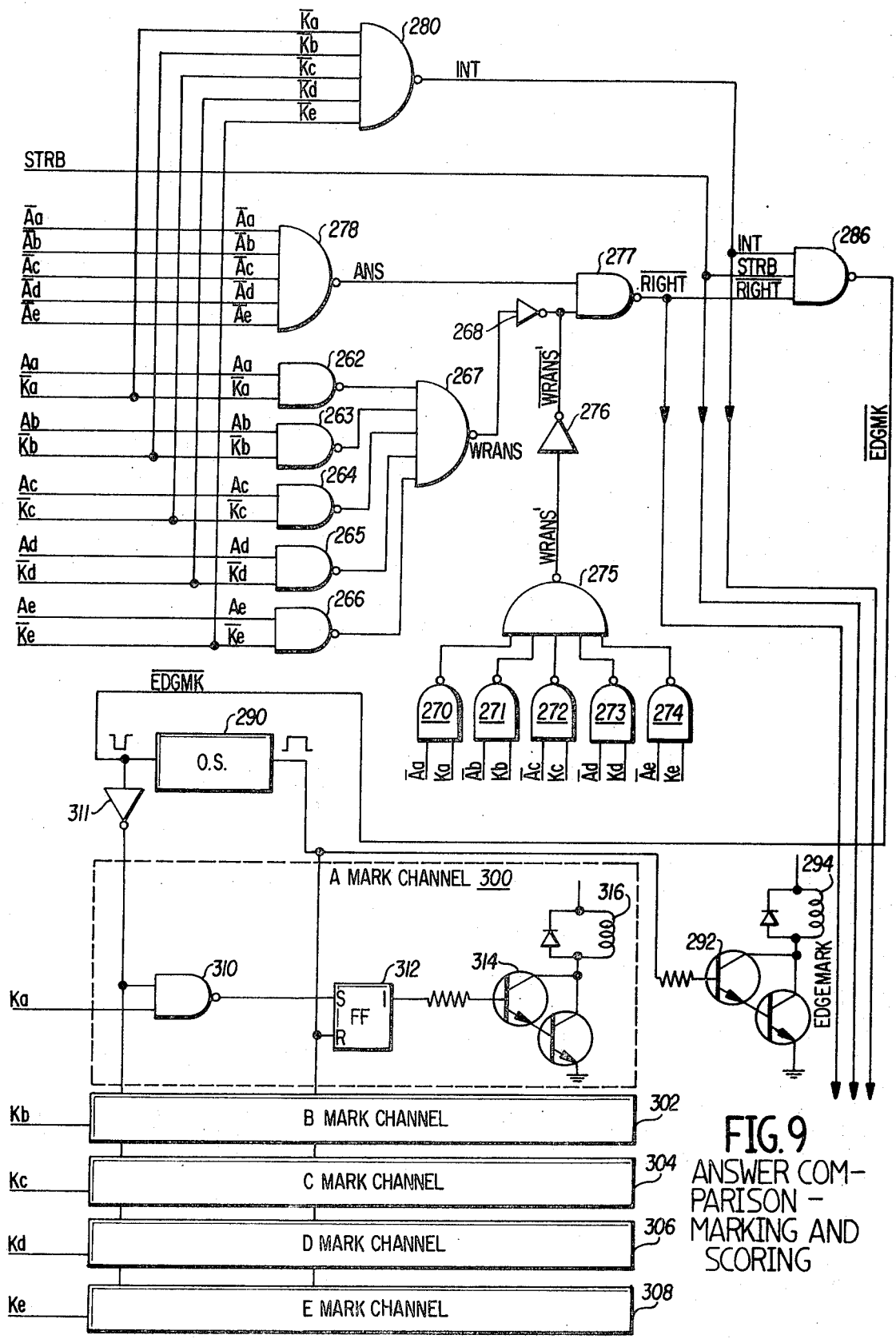
FIG. 9 is a schematic, partly in block diagram form, of answer comparison, and scoring and marking circuits utilized in the system of the invention.

The circuits for performing the answer comparison and marking functions are shown in FIG. 9. In general, for each item, or problem sensed from a student card, the student answer mark signals are compared with the correct answer signals provided at the output of the dynamic memory during the strobe pulse, and thus during the clock pulse interval in which the correct answer information for the item corresponding to that currently being sensed from a student card is presented at the outputs of those memories. As previously discussed, selective mark discrimination restricts the sensed answer mark to the single one whose level exceeds all others and, as well, the threshold level and, alternatively, when disabled, multiple mark sensing and comparison may be performed.

The comparison of the sensed answer indicia from the student card, for each item thereon, with the correct answer information programmed into the memory is performed by two similar sets of logic comparison circuits. The first set determines that a sensed answer on a student card does not correspond with a correct answer programmed into the memory and thus constitutes a wrong answer. The second set responds to the presence of an answer programmed in memory as to which a student card does not contain a corresponding answer selection or, in other words, the student has omitted making an answer selection for an answer which is in fact a correct answer.

The first logic circuit more specifically includes a plurality of two input NAND gates 262–266 receiving respectively as inputs thereto the mark sensing signals for the corresponding channels A through E from sensing of a given item of a student card, and the correct answer information bits programmed in the memory for that corresponding item, as derived from the program card. By way of example, for a given item, if a student answer mark A is sensed, A$a$ is true and if that is a correct answer, the corresponding bit from the memory, $\overline{Ka}$ is false and NAND 262 produces a true output. In the event that the student answer selection does not correspond to a programmed answer in memory, both inputs to NAND 262 are true and the output is false. As long as all inputs are true, NAND 262 produces a false WRANS output. If any input is false, however, WRANS is true.

The second logic circuit more specifically includes NAND gates 270 – 174 respectively receiving the complements of the inputs to NAND gates 262 – 266. In similar fashion, therefore, WRANS' is normally false but in the event that a student has failed to select a correct answer as programmed in memory, WRANS' becomes true.

WRANS and WRANS' are supplied, respectively, through inverters 268 and 276 to a first input of NAND gate 277, the latter receiving ANS at its second input from NAND 278. NAND 278 produces a true ANS output as long as at least one answer mark is afforded for a given item on a student card. Thus, if an answer mark is provided and thus ANS is true and, further, that answer corresponds to a programmed correct answer and thus $\overline{WRANS}$ is true, and, as well, there is no programmed correct answer as to which a student answer mark has been omitted and thus $\overline{WRANS'}$ is likewise true, NAND 277 produces a false $\overline{RIGHT}$ output. Conversely, if no student answer mark is provided, ANS is false and NAND 277 produces a true $\overline{RIGHT}$ output. Similarly, if one or more incorrect student answer marks are sensed, $\overline{WRANS}$ is false and correspondingly $\overline{RIGHT}$ is true. As well, if a correct answer as programmed is omitted from the student answers, $\overline{WRANS'}$ is false and the $\overline{RIGHT}$ output again is true. In each of these instances, therefore, the student answer is considered not right, or incorrect. If desired, switching circuits for selecting the functions of either or both of the two answer comparison circuits may be afforded and separate outputs derived for distinguishing between incorrect answers resulting from incorrect answer selections and incorrect answers resulting from the failure to provide an answer mark for a programmed correct answer, i.e., omitted answers.

NAND gate 280 receives the complements of the programmed memory outputs in parallel for each item and produces a true INT output as long as at least one programmed correct answer is provided for a given item. The INT output signifies that the detected student answer selections should be interrogated in accordance with the results of the foregoing comparison logic functions since the program card has in fact been programmed with at least one correct answer selection for that given item. It follows that this logic step permits eliminating one or more problems from the scoring operation such as where less than all item positions of a student card have been used in a given examination and, as well, where an instructor, for example, determines subsequently to giving an examination that one of the problems was itself in error and thus chooses to eliminate it from the scoring.

In general, therefore, the interrogation function of INT provides for count accumulation of the number of correct answers, wrong answers, and omitted answers or any lesser number of these counting operations, as desired. It also controls a marking operation to provide edge marks on the cards identifying incorrectly answered problems and, as well, to provide correct answer marking of the card adjacent the correct answer position in the event that a correct answer has not been marked thereon by the student.

The edge marking function is performed by NAND 286 receiving INT and STRB as aforedescribed and, as well, $\overline{RIGHT}$. A false output $\overline{EDGMK}$ is produced when these inputs are all true, and which triggers one shot 290. The latter generates a square wave pulse which is supplied to a Darlington circuit amplifier 292 for energization of an edge mark solenoid 294.

Correct answer marking is provided by marking channels 300, 302, 304, 306 and 308 corresponding to the answer columns A through E, respectively. These marking channels are identical and, thus, only the circuit for channel A is shown in detail.

The A channel marking circuit 300 includes NAND gate 310 receiving the correct answer output K$a$ from the A channel shift register of FIG. 8 and, as well, through inverter 311, the complement of $\overline{EDGMK}$, and which constitutes a positive going pulse whenever an answer is incorrect or omitted. If A is a programmed correct answer, K$a$ is true and thus NAND 310 produces a false output, triggering one shot 312. The latter produces a square wave pulse output for energizing the trigger circuit 314 and energizing the marking solenoid 316 for marking the card in the A column for that item. Each of the channels A through E operates in an identical manner to energize its associated marking and means for marking the corresponding column position for that item in accordance with the programmed correct answers for each item.

As noted, circuit modifications may be made to select the conditions as to the marking and scoring, as desired. As shown, the error and correct answer marking is performed, indicating an incorrect answer, where any programmed correct answer has not been selected—even if multiple correct answers are programmed and some but less than all are selected. Obvious modifications, however, permit other scoring conditions. For example, an item may be scored as correctly answered where, for multiple programmed answers, at least one thereof has been selected. Thus, the requisite modifications to the logic processing circuits for accomplishing scoring in accordance with any desired scoring criterion will be apparent to those skilled in the art.

Figure 10:
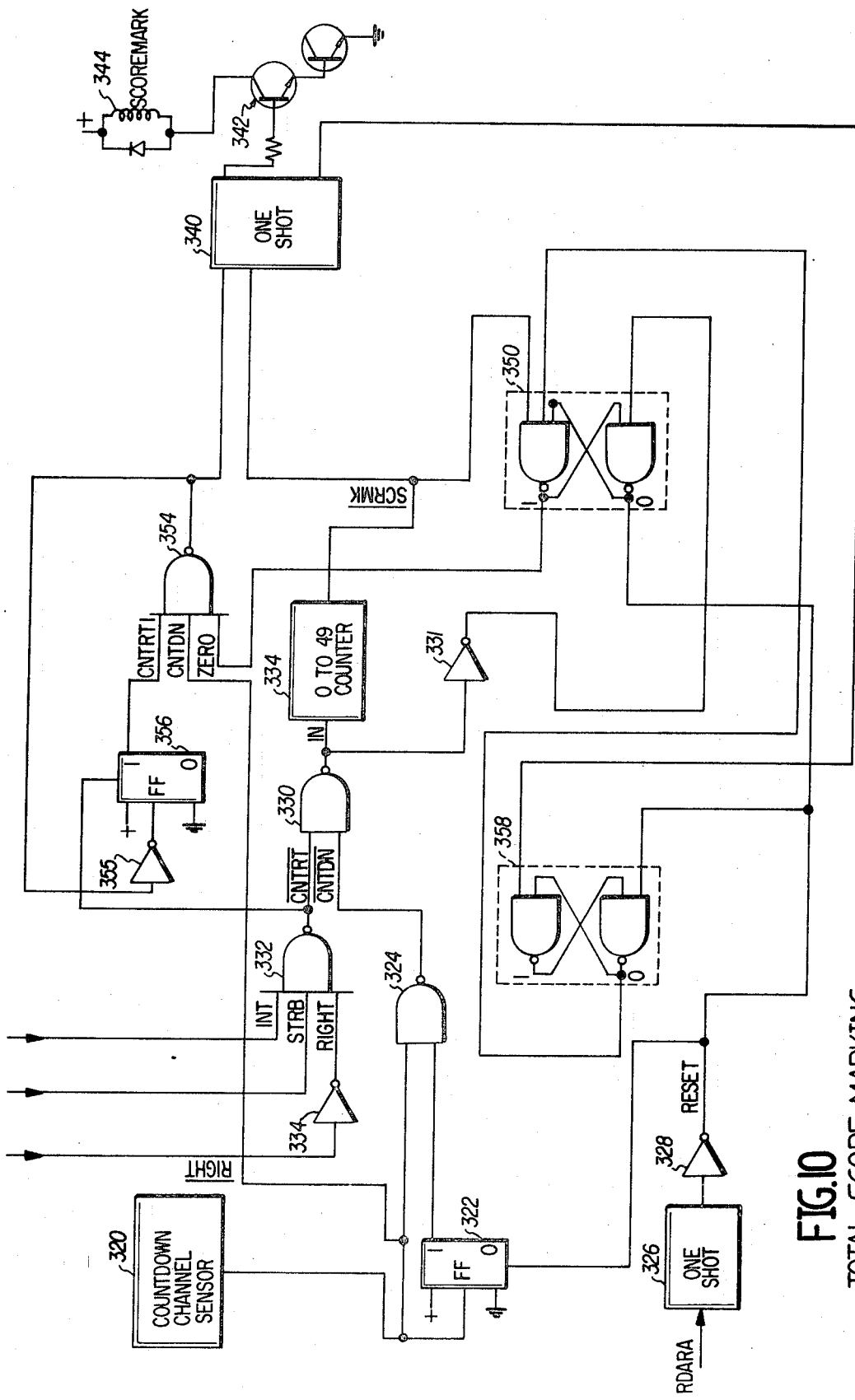
FIG. 10 is a schematic, partly in block diagram form, of total score marking circuits utilized in the system of the invention.

In FIG. 10 are shown the circuits for effecting total score marking on the marking column 64 of the student card of FIG. 4 as aforedescribed. This portion of the system includes a further photosensor and associated circuitry 320 which is positioned to sense the column of timing marks 61 from the student card of FIG. 4 as the latter is exhausted from the apparatus and subsequently to the foregoing mark sensing logic comparison and grading operations. A timing pulse is produced by the channel 320 for each timing mark from the output, as indicated, those pulses being supplied in parallel to flip-flop 322 and the first input of NAND 324. One shot 326 responds to RDARA to produce, through inverter 328, a reset pulse for the flip-flop 322. Flip-flop 322 and NAND 324 operate in a manner, as previously described with regard to similar circuits, to blank the first pulse produced upon sensing the first timing mark. Hence, NAND 324 produces a succession of 50 false output $\overline{CNTDN}$ pulses initiating with the second of the column of 51 timing marks. For each card, therefore, 50 $\overline{CNTDN}$ pulses are produced and supplied to NAND gate 330.

NAND 330 also receives the $\overline{CNTRT}$ output of NAND 332, the latter receiving as inputs INT and STRB, discussed in relation to FIG. 9, and through inverter 334, RIGHT, the complement of $\overline{RIGHT}$ of FIG. 9. As noted, $\overline{CNTRT}$ is produced during the grading operation and comprises a series of pulses corresponding in number to the number of correct answers. If desired, and as previously noted, alternative scoring input signals may be employed such as signals representing the number of wrong answers or the number of omitted answers or some other scoring result, and would be supplied in lieu of $\overline{CNTRT}$. As well, duplicate scoring systems affording two or more different scoring outputs and receiving respectively associated different types of scoring signals may be provided. It is therefore to be understood that CNTRT is also representative of any other such scoring signal pulse train as may be employed.

NAND 330 functions as a logical OR to the inputs $\overline{CNTRT}$ and $\overline{CNTDN}$. As noted, the former is produced in a grading operation and thus occurs separately in advance of the series of pulses $\overline{CNTDN}$ produced during the exhaust operation. As also previously explained, flip-flop 322 and NAND 324 operate to blank the first countdown pulse from channel 320 and thus to produce 50 $\overline{CNTDN}$ pulses, supplied to NAND 330.

Accordingly, counter 334 receives a number of IN pulses corresponding to the number of correct answers determined during the grading operation and retains the count thus accumulated. During the exhaust phase, counter 334 resumes counting in accordance with the train of IN pulses produced by CNTDN. Counter 334 counts from 0 to 49, the 50th input thereto causing recycling to a zero count. As more fully described hereafter, RDARA supplied through one shot 326 and inverter 328 resets counter 334, or clears it, to a zero count prior to the scoring operation for each card. Thus, when a sum total of 50 IN pulses is produced by $\overline{CNTRT}$ during scoring and subsequently by $\overline{CNTDN}$ during exhaust, the counter 334 recycles to zero and produces the false output $\overline{SCRMK}$. The latter activates one shot 340 which in turn, through Darlington circuit 342, energizes the score mark solenoid 344.

By proper positioning of the score marking solenoid 344 with reference to the countdown channel sensor 322 along the exhaust path of the student card, and by virtue of the relationship of the score positions of column 64 and the column of timing marks 61, it therefore will be seen that solenoid 344, when energized as aforesaid, actuates a marking device to place a mark adjacent the score corresponding to the number of correct answers. In general, it will be seen that the lower the correct score accumulated by counter 334, the greater the number of countdown pulses required to bring counter 334 to its maximum count and recycle to zero. Thus, in view of the decreasing sequence of score values in column 64 with regard to the direction of card transport, i.e., bottom edge leading, the lower is the value of the score which is marked in the column 64, as is appropriate.

To resolve any ambiguity which may exist between a perfect score, i.e., 50 correct answers, and a zero score, i.e., no correct answers, the following circuits are provided. Flip-flop 350 responds to the $\overline{SCRMK}$ output of counter 334 to be set to a true state and hence produce a true ZERO output. The ZERO output is supplied to counter 334 to clear it and reset its count to zero, and also to NAND 354. NAND 354 receives CNTDN from the sensing channel 320 and thus during countdown, the first countdown pulse, although normally blanked as to the counter 334 by flip-flop 322 and NAND 324, is supplied to NAND 354. In addition, NAND 354 receives CNTRT 1 from flip-flop 356, the latter having been set up on the first $\overline{CNTRT}$ pulse—i.e., a first correct answer. Reset of flip-flop 356 is controlled by the output of NAND 354, through inverter 355.

Accordingly, NAND 354 receives 3 true inputs at the first countdown pulse when counter 334 has cycled to zero—which could indicate either 50 correct or 0 correct answers, but as well receives the ambiguity-resolving true input CNTRT 1 indicating that at least one correct answer has been received and, thus, that the co-existing true input ZERO represents a total correct score of 50. Accordingly, one shot 340 is triggered to energize scoremark solenoid 344.

Flip-flop 358 affords a further guarantee of accurate marking in that it is set by the reset output of one shot 340 whenever the latter is triggered to produce a score mark. The reset output of flip-flop 358 controls flip-flop 350, as indicated, locking the latter in a true state whereby the latter resets and holds the counter 354 at a zero count. Counter 354 thus does not respond to subsequent IN pulses received during the countdown for a given card. Flip-flop 358 is reset by RDARA, received through one shot 326 and inverter 328, upon initiation of processing of a subsequent card, thereby releasing the counter 334 for the counting operations as aforedescribed.

It will be appreciated that, in the disclosed embodiment, the countdown operation actually results in a continuing forward count of counter 354, the latter effectively recycling to zero upon attaining its maximum count. Alternative counting schemes may as well be employed, as will be apparent.

In FIG. 11 are shown in schematic and block diagram from the power control and indicator circuits aforementioned. The main on/off switch 46 of FIG. 1 is shown at 46' for supplying power to a D.C. power supply 360 providing D.C. levels for the logic circuits and, as well, to one terminal of a motor 362 for the card transport. Depression of the start button 47, as aforedescribed, produces the START output from NAND 184 of FIG. 6 and, in FIG. 11, is supplied through Darlington circuit 364 to energize a relay 366. MTR from FIG. 6, produced when PRGMD is true and thus when the check card flip-flop 188 is in its reset state, i.e., the check card indication function has not been required, energizes Darlington circuit 366, which provides a holding circuit for relay 366 and thus maintains the motor 362 in an energized condition. That condition, of course, is maintained only for the reset time interval of one shot 180 unless and until it is retriggered by a further RDARA pulse and, as well, only as long as the check card flip-flop 188 is not set in accordance with its error detection functions. Also schematically shown in FIG. 11 are the indicator lamps 48' and 49' for the recirculation and check card indicators 48 and 49 of FIG. 1, energized through inverters 368 and 370, respectively, when the corresponding inputs CHK, CDS and PRGMD are true as aforedescribed in relation to FIG. 6.

Numerous modifications and adaptations of the system of the invention will be apparent to those skilled in the art. For example, it is clear that reference to program and student cards encompasses any type of document which is adapted to be fed in the successive manner described and that the method and system are useful in scoring, or analyzing, the answer selections indicated on any such type of source document. Further, the grading and scoring techniques are clearly not limited to academic examinations involving questions of the multiple choice type, but as well are applicable to the grading and scoring, i.e., in the broader sense of evaluation, of any type of item presented to elicit one or more responses as answer selections out of a group of several, or multiple, possible answer choices. Further, any of various scoring criteria, or combinations thereof, may be employed. Accordingly, it is intended by the appended claims to cover all such modifications and adaptations which fall within the true spirit and scope of the invention.

What is claimed is:

1. An automatically programmed grading and scoring system for grading answer selections to a plurality of items as identified by indicia applied to a student card, with regard to correct answers for those items as identified by indicia applied to a program card, each of said student and program cards furthermore including card identifying indicia distinguishing each thereof, comprising a sensing station including means for sensing card distinguishing indicia and for sensing answer indicia from said cards, means for receiving a program card and an associated set of student cards and transporting said program and associated student cards, in succession, through said sensing station, a memory including a plurality of synchronized recirculating memory channels corresponding to the number of answer selections for each item and each said channel including a number of storage positions corresponding to the number of items of each card, the recirculation rate of said memory exceeding the rate at which successive items are sensed from a card, first means operable in synchronism with said recirculating memory to identify the storage positions thereof as successively presented at the inputs to the memory channels, second means operable in synchronism with the sensing of successive items from each of said cards for identifying each said item, as sensed from each card, means for determining when the memory storage positions of said memory channels identified by said first means correspond to the item as identified by said second means, means responsive to sensing of a program card identifying indicia by said sensing means to establish a program mode for entry of correct answer information identified by indicia presented by the program card into the respectively corresponding storage positions of said memory channels as established by said determining means and responsive to sensing of student card identifying indicia by said sensing means to establish a grading mode for grading the answer indicia presented by the student card with regard to the correct answer information in the respectively corresponding storage positions of said memory channels as identified by said determining means, for each item of said card in succession.

2. A system as recited in claim 1, wherein said first and second means respectively comprise first and second counters.

3. A system as recited in claim 2 wherein there is further provided a clock source for driving said recirculating channels of said memory in recirculation at the clock rate, and said first means comprises a counter having a total count corresponding to said storage positions of said memory channels and responsive to said clock to cyclically count in synchronism with recirculation of said memory, said second means comprises a counter having a total count corresponding to the number of items of each card and responsive to sensing of successive items from each said card to be correspondingly advanced in the count thereof, and said determining means comprises a comparator for comparing the counts of said counters of said first and second means.

4. Apparatus as recited in claim 3, wherein each of said program and student cards includes a column of timing marks thereon respectively corresponding to the items of each card, said sensing station includes means for sensing said column of timing marks thereby to identify the respectively corresponding items and producing a synchronizing output pulse in response to sensing of each timing mark, said second counter responding to said SYNC pulses to advance the count thereof.

5. A system as recited in claim 4, wherein each student card includes a score mark column of consecutively numbered score values and there is further provided an exhaust channel through which each said card is exhausted following the sensing of indicia therefrom for programming as to each program card, and for grading and scoring as to each student card, further sensing means for sensing the column of timing marks as the card is transported through said exhaust channel, marking means mounted within said exhaust channel for marking each student card in said scoring column at a predetermined time during the exhaust of the student card, means responsive to the grading of answer selections for the plurality of items of each student card for establishing a score in accordance with desired scoring criteria for each said card, means responsive to the score thus established and to the sensing of the timing marks during exhaust of each student card by said further sensing means to actuate said score marking means at a time selected to mark the score value in the score mark column corresponding to the score established by said scoring means.

6. A system as recited in claim 5, wherein the score mark column is provided along a longitudinal edge of the student card and wherein said score marking means is positioned to imprint the score mark extending to that longitudinal edge, whereby a set of associated student cards may be stacked and the score marks be rendered visible to afford a qualitative indication of the scoring profile for the associated set of student cards.

7. A system as recited in claim 1, wherein there is further provided means responsive to the simultaneous sensing of program and student card distinguishing indicia to indicate an error condition.

8. A system as recited in claim 1, further comprising means responsive to the sensing of a program card distinguishing indicia for enabling the programming and subsequent grading modes of operation.

9. A system as recited in claim 8, wherein said enabling means disables any of said programming and grading and scoring modes of operation in the absence of sensing program card distinguishing indicia.

10. A system as recited in claim 8, wherein:

said enabling means further includes automatically reset timing means adapted to be set upon sensing of program card identifying indicia, and there is further provided means responsive to sensing of successive card distinguishing indicia for retriggering said automatically reset timing means, and said reset timing means, in the absence of being retriggered following initial setting thereof, disables said enabling means to terminate further grading and scoring.

11. A system as recited in claim 1, wherein each of said program and student cards includes an error position indicia thereon spanning the positions occupied by the card identifying indicia when a card is erroneously presented in reverse position for transport through said system, and there is further provided means responsive to simultaneous outputs of said program and student card sensing means to indicate an error condition.

12. A system as recited in claim 1, wherein said card identifying indicia comprise longitudinal marks on each of said program and student cards parallel to and respectively displaced by different distances from a common longitudinal edge thereby to identify and distinguish the said cards.

13. A grading and scoring system for grading answer selections to a plurality of items as identified by indicia applied to a student card with regard to programmed correct answers for those items and in accordance with a desired scoring criterion, each student card including a preprinted column of score values thereon, comprising:

a memory for storing programmed correct answers to a plurality of items, addressing means for identifying from said memory the correct answer information for each said item, means for sensing the answer selection indicia from a student card for each item, in succession, means for comparing the thus sensed answer selections with the programmed correct answers for the corresponding plurality of items for grading the answer selections for those items, means responsive to said comparing means for accumulating a score count in accordance with the desired scoring criterion, and means for identifying the individual score values of the preprinted column of each student card, subsequent to said grading and scoring of the answer selections thereon, and means responsive to said score count accumulating means for marking the card in the preprinted column thereof to identify the score value thereon corresponding to the accumulated score count.

14. A system as recited in claim 13, wherein each of said cards includes a column of timing marks including a mark corresponding to each item and there is further provided means for sensing the timing marks and producing countdown pulses in response thereto subsequent to the grading and scoring of the answer selections for each student card, gating means for receiving counts from said comparing means for supply to said accumulating means during a grading operation and alternatively operable to supply said countdown pulses to said accumulating means subsequent to said grading and scoring operation, said accumulating means having a maximum count corresponding to the total number of items of a card and producing an output when that maximum count is attained, and said marking means responding to said output for marking the card to identify the score value.

15. A system as recited in claim 14, wherein there is further provided means responsive to a maximum count output of said count accumulating means to to a first correct answer identified by said comparing means for actuating said marking means.

16. A system as recited in claim 13, wherein said comparing means comprises a first plurality of gates respectively responsive to student and program answer indicia for corresponding answer selections for each item and identifying the presence of student answer indicia which does not correspond to programmed correct answer indicia for each said item and a second plurality of gates respectively responsive to student and program answer indicia for the corresponding answer selections for each item and identifying each program correct answer for which no student answer has been provided.

17. A method of grading and scoring answer selections to a plurality of items as identified by indicia applied to a student card with regard to programmed correct answers for those items and in accordance with a desired scoring criterion, each student card including a preprinted column of score values thereon, comprising:

storing correct answers to a plurality of items, sensing the answer selection indicia from a student card for each item, in succession, comparing the thus sensed answer selections with the programmed correct answers for the corresponding plurality of items for grading the answer selections for those items, accumulating a score count in accordance with the desired scoring criterion for the compared answers, and transporting each student card through a score marking station subsequent to the answer grading operation and identifying the individual score values of the preprinted column in succession while the card is transported, and responding to the successive identifications of individual score values of the preprinted column in accordance with the accumulated count of the score to time the actuation of a marking means thereby rendered operative to mark the student card in the preprinted column adjacent the score value theretofore determined.

* * * * *